United States Patent
Njemanze

(10) Patent No.: US 8,230,512 B1
(45) Date of Patent: *Jul. 24, 2012

(54) TIMESTAMP MODIFICATION IN A NETWORK SECURITY SYSTEM

(75) Inventor: Hugh S. Njemanze, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 97 days.

This patent is subject to a terminal disclaimer.

(21) Appl. No.: 12/493,012

(22) Filed: Jun. 26, 2009

Related U.S. Application Data

(63) Continuation of application No. 10/733,073, filed on Dec. 10, 2003, now Pat. No. 7,565,696.

(51) Int. Cl.
*G06F 11/00* (2006.01)
(52) U.S. Cl. ............... 726/25; 726/22; 726/23; 709/224
(58) Field of Classification Search .................. 713/176, 713/178; 726/22–25; 709/224; 370/289, 370/503
See application file for complete search history.

(56) References Cited

U.S. PATENT DOCUMENTS

| | | | |
|---|---|---|---|
| 4,914,444 A * | 4/1990 | Pifer et al. .................... | 342/460 |
| 5,402,394 A | 3/1995 | Turski | |
| 5,557,742 A | 9/1996 | Smaha et al. | |
| 5,717,919 A | 2/1998 | Kodavalla et al. | |
| 5,850,516 A | 12/1998 | Schneier | |
| 5,896,524 A * | 4/1999 | Halstead et al. ............. | 713/375 |
| 5,956,404 A | 9/1999 | Schneier et al. | |
| 5,978,475 A | 11/1999 | Schneier et al. | |
| 6,070,244 A | 5/2000 | Orchier et al. | |
| 6,134,664 A | 10/2000 | Walker | |
| 6,148,049 A | 11/2000 | Hein | |
| 6,157,957 A | 12/2000 | Berthaud | |

(Continued)

FOREIGN PATENT DOCUMENTS

WO    WO 02/45315 A2    6/2002

(Continued)

OTHER PUBLICATIONS

U.S. Appl. No. 60/405,921, filed Aug. 26, 2002, Gisby et al.

(Continued)

*Primary Examiner* — Kim Vu
*Assistant Examiner* — Suman Debnath

(57) ABSTRACT

Clocks used by network security devices can be synchronized by a network security system. In one embodiment, the synchronization can include the network security system receiving a first stream of alerts from a first network security device having a first clock, each alert in the first stream representing an event detected by the first network security device and including a time of detection by the first network security device according to the first clock. Similarly, the network security system can receive a second stream of alerts from a second network security device having a second clock, each alert in the second stream representing an event detected by the second network security device and including a time of detection by the second network security device according to the second clock. The system can then identify a common event represented by a first alert in the first stream from the first network security device and by a second alert in the second stream from the second network security device, and then synchronize the first clock and the second clock using the common event.

18 Claims, 2 Drawing Sheets

U.S. PATENT DOCUMENTS

| | | | |
|---|---|---|---|
| 6,192,034 | B1 | 2/2001 | Hsieh et al. |
| 6,275,942 | B1 | 8/2001 | Bernhard et al. |
| 6,321,338 | B1 | 11/2001 | Porras et al. |
| 6,408,391 | B1 | 6/2002 | Huff et al. |
| 6,408,404 | B1 | 6/2002 | Ladwig |
| 6,484,203 | B1 | 11/2002 | Porras et al. |
| 6,542,075 | B2 | 4/2003 | Barker et al. |
| 6,694,362 | B1 | 2/2004 | Secor et al. |
| 6,704,874 | B1 * | 3/2004 | Porras et al. ............... 726/22 |
| 6,708,212 | B2 | 3/2004 | Porras et al. |
| 6,711,615 | B2 | 3/2004 | Porras et al. |
| 6,760,687 | B2 | 7/2004 | Apel et al. |
| 6,839,850 | B1 | 1/2005 | Campbell et al. |
| 6,928,556 | B2 | 8/2005 | Black et al. |
| 6,966,015 | B2 | 11/2005 | Steinberg et al. |
| 6,985,920 | B2 | 1/2006 | Bhattacharya et al. |
| 6,988,208 | B2 | 1/2006 | Hrabik et al. |
| 7,039,953 | B2 | 5/2006 | Black et al. |
| 7,043,727 | B2 | 5/2006 | Bennett et al. |
| 7,047,435 | B2 | 5/2006 | Liou et al. |
| 7,089,428 | B2 | 8/2006 | Farley et al. |
| 7,127,743 | B1 | 10/2006 | Khanolkar et al. |
| 7,143,444 | B2 | 11/2006 | Porras et al. |
| 7,159,237 | B2 | 1/2007 | Schneier et al. |
| 7,168,093 | B2 | 1/2007 | Hrabik et al. |
| 7,171,689 | B2 | 1/2007 | Beavers |
| 7,219,239 | B1 | 5/2007 | Njemanze et al. |
| 7,260,844 | B1 | 8/2007 | Tidwell et al. |
| 7,278,160 | B2 | 10/2007 | Black et al. |
| 7,308,689 | B2 | 12/2007 | Black et al. |
| 7,318,178 | B2 | 1/2008 | Steinberg et al. |
| 7,333,999 | B1 | 2/2008 | Njemanze |
| 7,340,776 | B2 | 3/2008 | Zobel et al. |
| 7,370,359 | B2 | 5/2008 | Hrabik et al. |
| 7,376,969 | B1 | 5/2008 | Njemanze et al. |
| 7,379,993 | B2 | 5/2008 | Valdes et al. |
| 7,418,733 | B2 | 8/2008 | Connary et al. |
| 7,424,742 | B1 | 9/2008 | Dash et al. |
| 7,437,359 | B2 | 10/2008 | Aguilar-Macias et al. |
| 7,483,972 | B2 | 1/2009 | Bhattacharya et al. |
| 7,499,444 | B2 | 3/2009 | Bennett |
| 7,506,373 | B2 | 3/2009 | Morin et al. |
| 7,509,677 | B2 | 3/2009 | Saurabh et al. |
| 7,565,696 | B1 | 7/2009 | Njemanze |
| 7,644,365 | B2 | 1/2010 | Bhattacharya et al. |
| 2002/0019945 | A1 | 2/2002 | Houston et al. |
| 2002/0147803 | A1 | 10/2002 | Dodd et al. |
| 2002/0184532 | A1 | 12/2002 | Hackenberger et al. |
| 2003/0084349 | A1 | 5/2003 | Friedrichs et al. |
| 2003/0093692 | A1 | 5/2003 | Porras |
| 2003/0188189 | A1 | 10/2003 | Desai et al. |
| 2003/0221123 | A1 | 11/2003 | Beavers |
| 2004/0010718 | A1 | 1/2004 | Porras et al. |
| 2004/0024864 | A1 | 2/2004 | Porras et al. |
| 2004/0221191 | A1 | 11/2004 | Porras et al. |
| 2005/0027845 | A1 | 2/2005 | Secor et al. |
| 2006/0095587 | A1 | 5/2006 | Bhattacharya et al. |
| 2006/0212932 | A1 | 9/2006 | Patrick et al. |
| 2007/0136437 | A1 | 6/2007 | Shankar et al. |
| 2007/0150579 | A1 | 6/2007 | Morin et al. |
| 2007/0162973 | A1 | 7/2007 | Schneier et al. |
| 2007/0169038 | A1 | 7/2007 | Shankar et al. |
| 2007/0234426 | A1 | 10/2007 | Khanolkar et al. |
| 2008/0104046 | A1 | 5/2008 | Singla et al. |
| 2008/0104276 | A1 | 5/2008 | Lahoti et al. |
| 2008/0162592 | A1 | 7/2008 | Huang et al. |
| 2008/0165000 | A1 | 7/2008 | Morin et al. |
| 2009/0064333 | A1 | 3/2009 | Saurabh et al. |
| 2010/0058165 | A1 | 3/2010 | Bhattacharya et al. |

FOREIGN PATENT DOCUMENTS

| | | |
|---|---|---|
| WO | WO 02/060117 A1 | 8/2002 |
| WO | WO 02/078262 A1 | 10/2002 |
| WO | WO 02/101988 A2 | 12/2002 |
| WO | WO 03/009531 A2 | 1/2003 |
| WO | WO 2004/019186 A2 | 3/2004 |
| WO | WO 2005/001655 | 1/2005 |
| WO | WO 2005/026900 | 3/2005 |

OTHER PUBLICATIONS

ARCSIGHT, "About ArcSight Team," date unknown, [online] [Retrieved on Oct. 25, 2002] Retrieved from the Internet <URL: http://www.arcsight.com/about_team.htm>.

ARCSIGHT, "About Overview," Oct. 14, 2002, [online] [Retrieved on Apr. 21, 2006] Retrieved from the Internet <URL: http://web.archive.org/web/20021014041614/http://www.arcsight.com/about.htm>.

ARCSIGHT, "Contact Info," date unknown, [online] [Retrieved on Oct. 25, 2002] Retrieved from the Internet <URL: http://www.arcsight.com/contact.htm>.

ARCSIGHT, "Enterprise Coverage: Technology Architecture," date unknown, [online] Retrieved from the Internet <URL: http://www.snaiso.com/Documentation/Arcsight/arcsight_archdta.pdf>.

ARCSIGHT, "Managed Process: ArcSight Reporting System," date unknown, [online] Retrieved from the Internet <URL: http://www.snaiso.com/Documentation/Arcsight/arcsight_reportsys.pdf>.

ARCSIGHT, "Managed Process: Console-Based Management," date unknown, [online] Retrieved from the Internet <URL: http://www.snaiso.com/Documentation/Arcsight/arcsight_console.pdf>.

ARCSIGHT, "Precision Intelligence: SmartRules™ and Cross-Correlation," date unknown, [online] Retrieved from the Internet <URL: http://www.snaiso.com/Documentation/Arcsight/arcsight_correlation.pdf>.

ARCSIGHT, "Precision Intelligence: SmartAgent™," date unknown, [online] Retrieved from the Internet <URL: http://www.ossmanagement.com/SmartAgent.pdf>.

ARCSIGHT, "Product Info: Product Overview and Architecture," date unknown, [online] [Retrieved on Oct. 25, 2002] Retrieved from the Internet <URL: http://www.arcsight.com/product.htm>.

ARCSIGHT, "Product Info: 360° Intelligence Yields Precision Risk Management," date unknown, [online] [Retrieved on Oct. 25, 2002] Retrieved from the Internet <URL: http://www.arcsight.com/product_info01.htm>.

ARCSIGHT, "Product Info: ArcSight SmartAgents," Oct. 10, 2002, [online] [Retrieved on Apr. 21, 2006] Retrieved from the Internet <URL:http://web.archive.org/web/20021010135236/http://www.arcsight.com/product_info02.htm>.

ARCSIGHT, "Product Info: ArcSight Cross-Device Correlation," date unknown, [online] [Retrieved on Oct. 25, 2005] Retrieved from the Internet <URL: http://www.arcsight.com/product_info03.htm>.

ARCSIGHT, "Product Info: ArcSight Manager," date unknown, [online] [Retrieved on Oct. 25, 2002] Retrieved from the Internet <URL: http://www.arcsight.com/product_info04.htm>.

ARCSIGHT, "Product Info: ArcSight Console," date unknown, [online] [Retrieved on Nov. 15, 2002] Retrieved from the Internet <URL: http:www.arcsight.com/product_info05.htm>.

ARCSIGHT, "Product Info: ArcSight Reporting System," date unknown, [online] [Retrieved on Oct. 25, 2002] Retrieved from the Internet <URL: http:www.arcsight.com/product_info06.htm>.

ARCSIGHT, "Product Info: Enterprise Scaling," date unknown, [online] [Retrieved on Oct. 25, 2002] Retrieved from the Internet <URL: http://www.arcsight.com/product_info07.htm>.

ARCSIGHT, "Security Management for the Enterprise," 2002, [online] [Retrieved on Oct. 25, 2002] Retrieved from the Internet <URL: http:www.arcsight.com/>.

ARCSIGHT, "Technical Brief: How Correlation Eliminates False Positives," date unknown, source unknown.

Burleson, D., "Taking Advantage of Object Partitioning in Oracle8i," Nov. 8, 2000, [online] [Retrieved on Apr. 20, 2004] Retrieved from the Internet <URL: http://www.dba-oracle.com/art_partit.htm>.

Derodeff, C. "Got Correlation? Not Without Normalization," 2002, [online] Retrieved from the Internet <URL: http://www.svic.com/papers/pdf/Got-Correlation_rmalization.pdf>.

Cheung, S. et al., "EMERALD Intrusion Incident Report: 601 Message Specification," Aug. 10, 2000, System Design Laboratory, SRI International.

National Institute of Standards and Technology (NIST), "Federal Information Processing Standards Publication (FIPS PUB) 199: Standards for Security Categorization of Federal Information and Information Systems", Feb. 2004.

Haley Enterprise, "Production Systems," 2002, [online] [Retrieved on Oct. 29, 2002] Retrieved from the Internet <URL: http://www.haley.com/0072567836705810/ProductionSystems.html>.

Haley Enterprise, "The Rete Algorithm," 2002, [online] [Retrieved on Oct. 29, 2002] Retrieved from the Internet <URL: http://www.haley.com/0072567836705810/ReteAlgorithm.html>.

Haley Enterprise, "A Rules Engine for Java Based on the Rete Algorithm," 2002, [online] [Retrieved on Oct. 29, 2002] Retrieved from the Internet <URL: http://www.haley.com/0072567836705810/ReteAlgorithmForRules.html>.

Halme, L.R. et al., "AINT Misbehaving: A Taxonomy of Anti-Intrusion Techniques," 2000, [online] [Retrieved on Nov. 1, 2002] Retrieved from the Internet <URL: http://www.sans.org/newlook/resources/IDFAQ/aint.htm>.

Lindqvist, U. et al., "Detecting Computer and Network Misuse Through the Production-Based Expert System Toolset (P-BEST)," Proceedings of the IEEE Symposium on Security and Privacy, Oakland, California, May 9-12, 1999.

CERT Coordination Center, "Overview of Attack Trends," 2002, [online] Retrieved from the Internet <URL: http://www.cert.org/archive/pdf/attack_trends.pdf>.

Porras, P.A. et al., "EMERALD: Event Monitoring Enabling Responses to Anomalous Live Disturbances," Oct. 1997, Proceedings of the 20$^{th}$ NIST-NCSC National Information Systems Security (NISS) Conference.

Porras, P.A. et al., "A Mission-Impact-Based Approach to INFOSEC Alarm Correlation," Oct. 2002, Lecture Notes in Computer Science, Proceedings: Recent Advances in Intrusion Detection, pp. 95-114, Zurich, Switzerland.

Ingargiola, G., "The Rete Algorithm," date unknown, [online] [Retrieved on Oct. 29, 2002] Retrieved from the Internet <URL: http://yoda.cis.temple.edu:8080/UGAIWWW/lectures/rete.html>.

Bruneau, G., "What Difficulties are Associated on Matching Events with Attacks. Why is Event/Data Correlation Important?," 2001, [online] [Retrieved on Nov. 1, 2002] Retrieved from the Internet <URL: http://www.sans.org/newlook/resources/IDFAQ/matching.htm>.

National Institutes of Health (NIH), "Table 1: Security Categorization of Federal Information and Information Systems," revised Jul. 8, 2005, [online] [retrieved on Apr. 6, 2006] Retrieved from the Internet <URL: http://irm.cit.nih.gov/security/table1.htm>.

Wood, M., et al., "Internet-Draft: Intrusion Detection Message Exchange Requirements," Jun. 23, 2002, [online] [Retrieved on Nov. 1, 2002] Retrieved from the Internet <URL: http://www.silicondefense.com/idwg/draft-ietf-idwg-requirements-07.txt>.

Heberlein, L. T., et al., "A Method to Detect Intrusive Activity in a Networked Environment," Proceedings of the Fourteenth National Computer Security Conference, NIST/NCSC, Oct. 1-4, 1991, Washington, D.C., pp. 362-371.

Javitz, H. S., et al., "The NIDES Statistical Component Description and Justification," SRI Project 3131, Contract N00039-92-C-0015, Annual Report, A010, Mar. 7, 1994.

Jou, Y. F., et al., "Architecture Design of a Scalable Intrusion Detection System for the Emerging Network Infrastructure," MCNC, Technical Report CDRL A005, Apr. 1997.

Porras, P. A., et al., "Live Traffic Analysis of TCP/IP Gateways," Symposium on Networks and Distributed Systems Security, Internet Society, Mar. 1998.

Robinson, S. L., "Memorandum Opinion" in *SRI International, Inc. v. Internet Security Systems, Inc.* and Symantec Corporation (D. Del., Civ. No. 04-1199-SLR), Oct. 17, 2006.

Valdes, A., et al., "Statistical Methods for Computer Usage Anomaly Detection Using NIDES (Next-Generation Intrusion Detection Expert System)," Proceedings of the Third International Workship on Rough Sets and Soft Computing (RSSC 94), Jan. 27, 1995, San Jose, CA, pp. 306-311.

U.S. Appl. No. 10/308,767, filed Dec. 2, 2002.
U.S. Appl. No. 10/308,548, filed Dec. 2, 2002.
U.S. Appl. No. 10/308,941, filed Dec. 2, 2002.
U.S. Appl. No. 10/308,416, filed Dec. 2, 2002.
U.S. Appl. No. 10/308,418, filed Dec. 2, 2002.
U.S. Appl. No. 10/308,417, filed Dec. 2, 2002.
U.S. Appl. No. 10/308,584, filed Dec. 2, 2002.
U.S. Appl. No. 10/713,471, filed Nov. 14, 2003.
U.S. Appl. No. 10/683,221, filed Oct. 10, 2003.
U.S. Appl. No. 10/683,191, filed Oct. 10, 2003.
U.S. Appl. No. 10/821,459, filed Apr. 9, 2004.
U.S. Appl. No. 10/839,563, filed May 4, 2004.
U.S. Appl. No. 10/975,962, filed Oct. 27, 2004.
U.S. Appl. No. 10/974,105, filed Oct. 27, 2004.
U.S. Appl. No. 11/029,920, filed Jan. 4, 2005.
U.S. Appl. No. 11/021,601, filed Dec. 23, 2004.
U.S. Appl. No. 11/070,024, filed Mar. 1, 2005.
U.S. Appl. No. 11/740,203, filed Apr. 25, 2007.
U.S. Appl. No. 11/836,251, filed Aug. 9, 2007.
U.S. Appl. No. 12/098,322, filed Apr. 4, 2008.
U.S. Appl. No. 11/023,942, filed Dec. 24, 2004, pp. 1-26.

* cited by examiner

US 8,230,512 B1

TIMESTAMP MODIFICATION IN A NETWORK SECURITY SYSTEM

CROSS-REFERENCE TO RELATED APPLICATION

The present application is a continuation of U.S. patent application Ser. No. 10/733,073, filed on Dec. 10, 2003, now U.S. Pat. No. 7,565,696, entitled "Synchronizing Network Security Devices Within A Network Security System", which is incorporated herein by reference.

FIELD OF THE INVENTION

The present invention relates to network security devices, and, in particular, a network security system analysing data from plurality of network security devices.

BACKGROUND

Computer networks and systems have become indispensable tools for modern business. Today terabits of information on virtually every subject imaginable are stored in and accessed across such networks by users throughout the world. Much of this information is, to some degree, confidential and its protection is required. Not surprisingly then, various network security monitor devices have been developed to help uncover attempts by unauthorized persons and/or devices to gain access to computer networks and the information stored therein.

Network security devices—also referred to as sensor devices, sensor products, security devices, and other similar names—largely include Intrusion Detection Systems (IDSs), which can be Network or Host based (NIDS and HIDS respectively). Other network security products include firewalls, router logs, and various other event reporting devices. Due to the size of their networks, many enterprises deploy many instances of these devices throughout their networks. Each network security device has a clock by which it tells time. However, these clocks may be out of synchronization with respect to each other.

SUMMARY OF THE INVENTION

Clocks used by network security devices can be synchronized by a network security system. In one embodiment, the synchronization can include the network security system receiving a first stream of alerts from a first network security device having a first clock, each alert in the first stream representing an event detected by the first network security device and including a time of detection by the first network security device according to the first clock. Similarly, the network security system can receive a second stream of alerts from a second network security device having a second clock, each alert in the second stream representing an event detected by the second network security device and including a time of detection by the second network security device according to the second clock. The system can then identify a common event represented by a first alert in the first stream from the first network security device and by a second alert in the second stream from the second network security device, and then synchronize the first clock and the second clock using the common event.

BRIEF DESCRIPTION OF THE DRAWINGS

The present invention is illustrated by way of example, and not by way of limitation, in the figures of the accompanying drawings in which like reference numerals refer to similar elements and in which.

DETAILED DESCRIPTION

Figure 1:
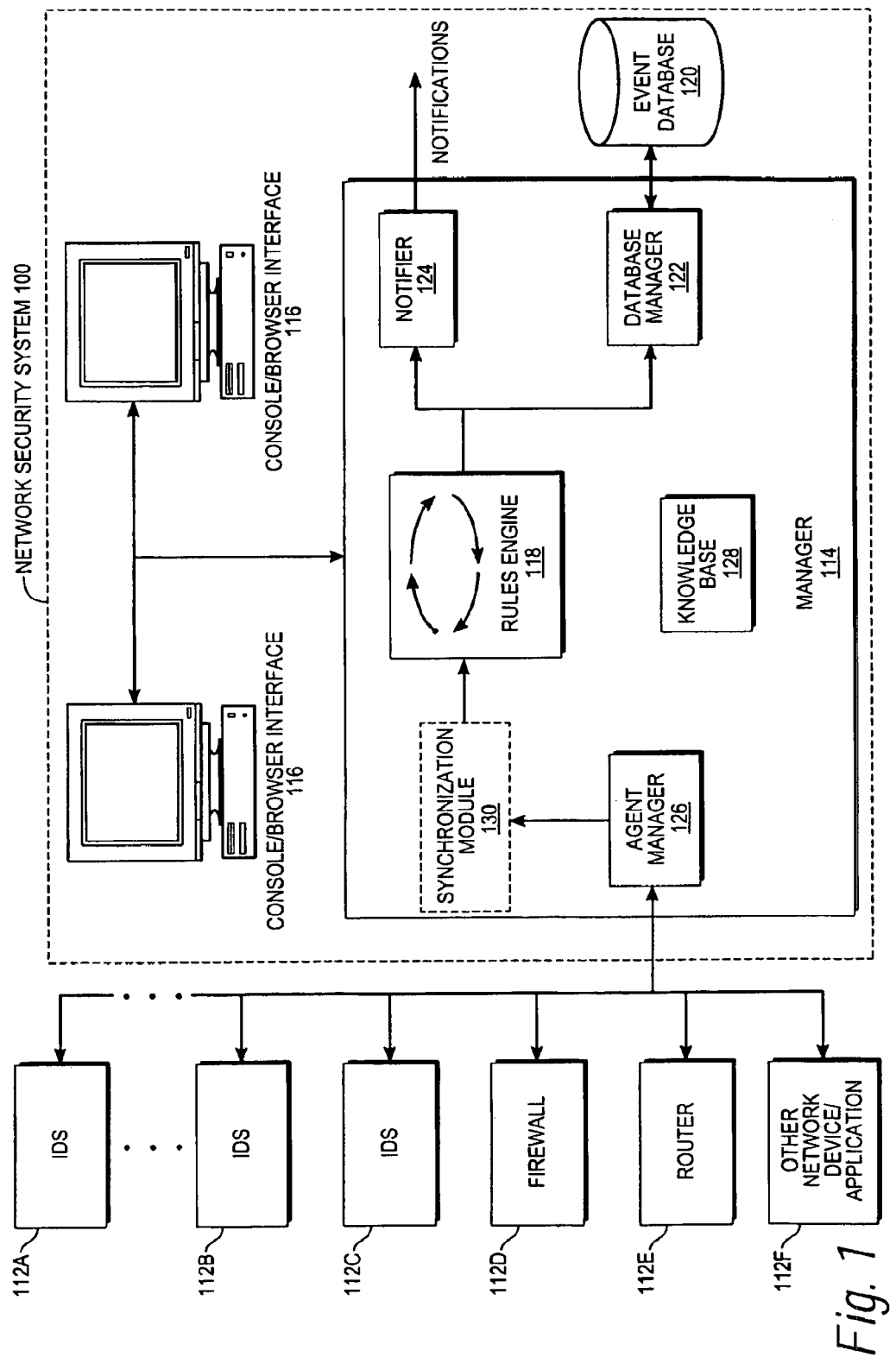
FIG. 1 is a block diagram illustrating a network security system in which embodiments of the present invention may be implemented.

Described herein is a method and apparatus for synchronizing the internal clocks of various security devices of a network security system.

Although the present system will be discussed with reference to various illustrated examples, these examples should not be read to limit the broader spirit and scope of the present invention. For example, the examples presented herein describe distributed agents, managers and various network devices, which are but one embodiment of the present invention. The general concepts and reach of the present invention are much broader and may extend to any computer-based or network-based security system.

Some portions of the detailed description that follows are presented in terms of algorithms and symbolic representations of operations on data within a computer memory. These algorithmic descriptions and representations are the means used by those skilled in the computer science arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

As indicated above, one embodiment of the present invention is instantiated in computer software, that is, computer readable instructions, which, when executed by one or more computer processors/systems, instruct the processors/systems to perform the designated actions. Such computer software may be resident in one or more computer readable media, such as hard drives, CD-ROMs, DVD-ROMs, read-only memory, read-write memory and so on. Such software may be distributed on one or more of these media, or may be made available for download across one or more computer networks (e.g., the Internet). Regardless of the format, the computer programming, rendering and processing techniques discussed herein are simply examples of the types of programming, rendering and processing techniques that may be used to implement aspects of the present invention. These examples should in no way limit the present invention, which is best understood with reference to the claims that follow this description.

Network Security System

With reference to FIG. 1, an example of a computer-based network security system 100, in which an embodiment of the present invention can be implemented, is illustrated. Network security system 100 collects alerts from various network security devices 112. These devices can include various IDSs 112A-C, which can be host or network based, firewalls 112D, routers 112E, and various other security devices and products 112F. These devices generate various alerts that represent physical events and incidents occurring in the network being monitored. Each of these devices has access to an internal or external clock that they can use to add timestamps to the generated alerts. In one embodiment, distributed agents of the network security system 100 collect these alerts.

Agents are software programs that provide efficient, real-time (or near real-time) local event data capture and filtering from a variety of network security devices and/or applications. The primary sources of security events are common network security products, such as the firewalls, intrusion detection systems and operating system logs described above. Agents can collect alerts from any source that produces event logs or messages and can operate at the native device, at consolidation points within the network, and/or through simple network management protocol (SNMP) traps.

The network security system 100 can include a manager 114. In one embodiment, managers 114 are server-based components that further consolidate, filter and cross-correlate alerts received from the agents, employing a rules engine 118 and a centralized event/alert database 120. One role of manager 114 is to capture and store all of the real-time and historic event data to construct (via database manager 122) a complete, enterprise-wide picture of security activity. The manager 114 also provides centralized administration, notification (through one or more notifiers 124), and reporting, as well as a knowledge base 128 and case management workflow. The manager 114 may be deployed on any computer hardware platform and one embodiment utilizes a relational database management system such as an Oracle™ database to implement the event data store component. Communications between manager 114 and the distributed agents may be bi-directional (e.g., to allow manager 114 to transmit commands to the platforms hosting agents) and encrypted.

Consoles 116 are computer- (e.g., workstation-) based applications that allow security professionals to perform day-to-day administrative and operation tasks such as event monitoring, rules authoring, incident investigation and reporting. Access control lists allow multiple security professionals to use the same system and event database, with each having their own views, correlation rules, alerts, reports and knowledge base appropriate to their responsibilities. A single manager 114 can support multiple consoles 116.

In some embodiments, a browser-based version of the console 116 may be used to provide access to security events, knowledge base articles, reports, notifications and cases. That is, the manager 114 may include a web server component accessible via a web browser hosted on a personal or hand-held computer (which takes the place of console 116) to provide some or all of the functionality of a console 116. Browser access is particularly useful for security professionals that are away from the consoles 116 and for part-time users. Communication between consoles 116 and manager 114 is bi-directional and may be encrypted.

As mentioned above, the rules engine 118 is used to correlate alerts to produce meta-alerts, i.e., higher level alerts. For example, one rule may be that if twenty or more unsuccessful logins are followed by a successful login from the same IP address within a specified time window, then a high-level alert representing a successful brute force dictionary attack is generated. Such rules are generally expressed as Boolean expressions, but can be expressed using expressions with different formats as well.

Many rules incorporate a temporal element. As implied above, twenty unsuccessful logins from one IP address during a year does not raise suspicions. People mistype their passwords on a regular basis. However, twenty unsuccessful logins within one minute begins to look like an attack, an unauthorized person (or machine) guessing at a password. To enable the execution of such time-sensitive rules, each alert generally includes a timestamp indicating when the respective security device detected the event reported by the alert. Each security device uses its own local clock to generate these timestamps.

An example is now given of how the performance of the network security system 100 may be reduced when the local clocks of the security devices 112 reporting to the system 100 are not synchronized. In this example, one rule of the rules engine 118 states that, if ALERT B is seen within 5 seconds of ALERT Y, then a high-level ALERT V is produced. For the purposes of this example, during the thirty second timeframe between 08:09:00 and 08:09:30, the agent manager 126 collects the following alerts from IDS1, as shown in Table 1:

TABLE 1

| Alerts From IDS1 | |
| --- | --- |
| Alert Name | Time of Detection (according to IDS1) |
| A | 08:09:03 |
| B | 08:09:10 |
| C | 08:09:17 |
| D | 08:09:22 |

During the same timeframe the agent manager 126 also collects the following alerts from IDS2, as shown in Table 2:

TABLE 2

| Alarms From IDS2 | |
| --- | --- |
| Alert Name | Time of Detection (according to IDS2) |
| X | 08:09:07 |
| Y | 08:09:16 |
| Z | 08:09:20 |
| W | 08:09:26 |

Form the data in Tables 1 and 2 above, it appears that ALERT B has not been seen within five seconds of ALERT Y, since ALERT B was detected six seconds before ALERT Y. Thus, the rules engine 118 would not correlate the two alerts to produce high-level ALERT V. However, if the clock used by IDS2 is two seconds ahead of the clock used by IDS1, then, in reality, the event giving rise to ALERT Y occurred only four seconds after the event giving rise to ALERT B. Thus, had the clocks been in synchronization, the rule should have been activated. Thus, the performance of the network security system was reduced because of this synchronization error.

Synchronizing Security Devices

One embodiment of the present invention is now described with reference to FIG. 2. The simplified example of IDS1 and IDS2 from the preceding section is also used to demonstrate security device synchronization according to one embodiment of the invention. In block 202, the manager 114 is receiving alerts representing various security events observed by a first security device, e.g. IDS1. At the same time, in block 204 the manager 114 is receiving alerts representing various security events observed by a second security device, e.g. IDS2.

In block 206, the manager 114 identifies a common event. In one embodiment, a common event is an event that is represented by an alert from both of the two security devices. The manager 114 may use a software module, such as synchronization module 130 in FIG. 1, to perform common event detection, and other synchronization related tasks. An example of a common event can be an XMAS scan event with the same source and target IP address detected separately by a Firewall and an IDS.

In one embodiment, a common event is detected when the same new source or target IP address is observed within a certain timeframe by two separate security devices. For example, if the first device observes a new target IP address at 10:10:05 and the second device observes the same new target IP address at 10:11:00, then a common event may be inferred. The timeframe should not be so narrow that all common events are missed unless the clocks are already synchronized, nor so wide that separate events are inferred to be common events. In one embodiment, the user of the system 100 can configure this common event detection timeframe.

In another embodiment, common events can be detected by observing corroborative alerts from similar devices within the timeframe discussed above. For example, if two IDS devices from different manufacturers report similar alerts at around the same time, a common event can be inferred. These common alert detection methods, and other similar methods, are not mutually exclusive and can be used concurrently. In one embodiment, the user of the system 100 can configure the common event detection rules, and is allowed to author new rules.

After a common event is identified, it can be used, in block 208, to synchronize the clocks of the two devices. For example, with reference to the example in the section above, if a common event is identified with respect to ALERT A and ALERT X (in other words, if both alerts are found to be representations of the same event), then it can be inferred that they were detected at the same time. Since the time of detection of ALERT A is four seconds prior to the time of detection of ALERT X, it can be further inferred that the clock in IDS2 is four seconds ahead of the clock in IDS1. This information can then be used to synchronize the two clocks.

In one embodiment, synchronizing the two clocks can be accomplished by making the two clocks meet in the middle. For example, the clock of IDS1 would be advanced by two seconds and the clock of IDS2 would be decreased by two seconds.

In another embodiment, one of the two device clocks would be designated a reference clock, and the other clock would be adjusted to the reference clock. For example, if the clock of IDS2 were selected to be the reference clock, then the clock of IDS1 would be advanced by four seconds. There can be various ways to select which clock should be the reference clock. In one embodiment, the decision can be arbitrary or random.

In another embodiment, deciding which of the clocks should be the reference clock for a particular adjustment depends on the relationship of the clocks to the main system-wide reference clock. A real world network security system 100 has more than two sensor devices 112 whose clocks can be synchronized using the present invention. For example, consider a system with five such security devices 112, labelled Device1 to Device5. In this system, the system-wide reference clock is the clock of Device3.

Therefore, if one of the two devices 112 whose alarms represent the common event that is used to synchronize the clocks of these two devices is Device3, the clock of the other device 112 will be the one to be adjusted. In other words, between Device3 and any other device 112, the clock of Device3 will be the reference clock. However, what if the clock of Device1 is being synchronized with the clock of Device2.

If neither of the clocks to be synchronized is the system-wide reference clock, then, in one embodiment, the clock that has been most recently synchronized with the system-wide reference clock will be selected as the reference clock. For example, if Device2 has been recently synchronized with Device3, but Device1 has not, then the clock of Device2 is selected as the reference clock to which the clock of Device1 is adjusted. Many other such rules are possible to select the reference clock between the clocks being synchronized.

Figure 2:
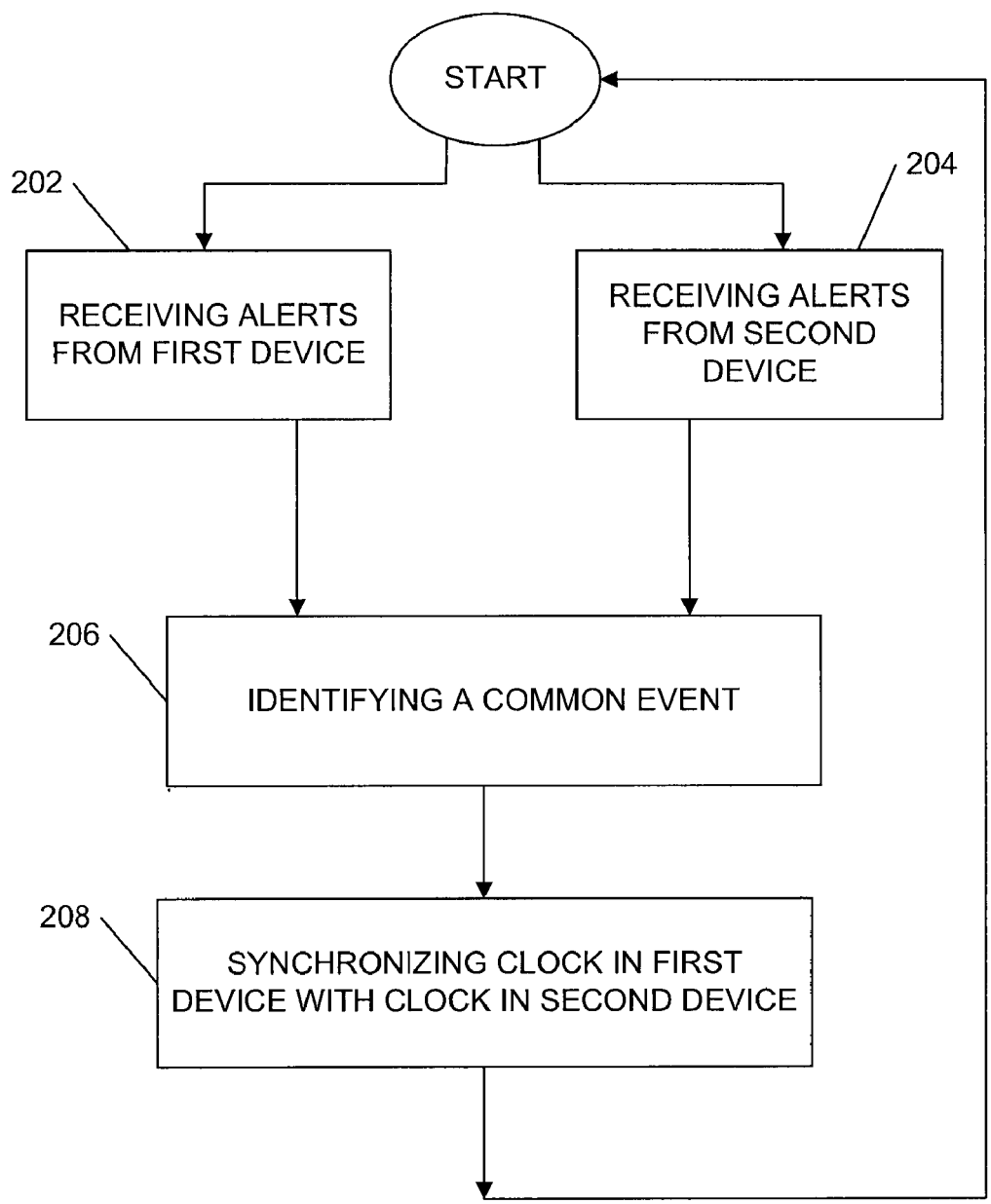
FIG. 2 is a flow diagram illustrating clock synchronization according to one embodiment of the present invention.

The discussion of FIG. 2 has assumed for simplicity that only two security devices 112 are being synchronized at a time. However, a common event can trigger alerts from many devices, allowing one of them to be designated as a reference clock to which the clocks of the other devices 112 can be adjusted. Thus, a common event reported by a subset of all network security devices 112 can be used to synchronize the entire subset of devices 112.

Furthermore, a common event that would trigger alerts from all, or substantially all, sensor devices 112 could be effectively used to synchronize all, or substantially all, the devices 112 at once. In one embodiment, one or more events are purposefully injected into the network being monitored by the security devices 112. Such a synchronization event can be designed to elicit alerts from a large number of the devices 112. In this manner, many of the devices 112 can be synchronized with one common, albeit induced, event.

For simplicity, the discussion of FIG. 2 has also assumed that the clocks of the individual devices 112 will be adjusted forward or backward. In a real world system, however, the network security system 100 may not have access to the clocks of the security devices 112. For example, IDS 112A may be a proprietary box that connects to a network, monitors the network, and generates alerts based on network activity. Its internal clock is not accessible for reprogramming by the manager 114. Indeed, if the clocks of all of the devices were accessible to the manager 114, the manager could synchronize all these clocks with the manager clock without detecting common events.

Thus, in one embodiment, at least some of the clocks to be synchronized using embodiments of the present invention are not accessible to a real life network security system 100. In one embodiment, the manager 114 can synchronize these clocks by keeping a clock database that stores the offsets for each clock relative to the system-wide reference clock. For example, assume that the clock of router 112E is determined to be five seconds behind the clock of IDS 112A, the clock of Firewall 112D is determined to be two seconds ahead of the clock of IDS 112A, and IDS 112A is the system-wide reference clock, the clock database will so indicate, e.g., by associating +5 with Router 112E, and −2 with Firewall 112D.

In one embodiment, the clock database can be maintained by, and be accessible to the synchronization module 130. Thus, the synchronization module 130 can perform synchronization by adjusting entries in the clock database. Furthermore, the synchronization module 130 can correct the timestamps of the alerts based on the clock database. In the example above, each timestamp from Router 112E would be replaced by a timestamp that has been incremented by five seconds to compensate for the five second lag of Router 112E with respect to IDS 112A.

Thus, a method and apparatus for synchronizing security devices being monitored by a network security system have been described. In the forgoing description, various specific modules, such as the "synchronization module," have been described. However, these names are merely to describe and illustrate various aspects of the present invention, and in no way limit the scope of the present invention. Furthermore, various modules, such as the manager 114 and the synchronization module 130 in FIG. 1, can be implemented as software or hardware modules, or without dividing their functionalities into modules at all. The present invention is not limited to any modular architecture, whether described above or not.

In the foregoing description, the various examples and embodiments were meant to be illustrative of the present invention and not restrictive in terms of their scope. Accordingly, the invention should be measured only in terms of the claims, which follow.

The invention claimed is:

1. A network security system comprising:
   a first agent comprising a processor configured to collect a first stream of alerts from a first network security device having a first clock, each alert in the first stream representing an event detected by the first network security device and including a time of detection by the first network security device according to the first clock;
   a second agent comprising a processor configured to collect a second stream of alerts from a second network security device having a second clock, each alert in the second stream representing an event detected by the second network security device and including a time of detection by the second network security device according to the second clock; and
   a manager in communication with the agents, the manager comprising a processor configured to:
      receive the first stream of alerts and the second stream of alerts;
      identify a first alert in the first stream and a second alert in the second stream, wherein the first alert represents a particular event, and wherein the second alert represents the same particular event;
      determine, based on the first alert and the second alert, whether the first clock and the second clock are synchronized; and
      when the first clock and the second clock are not synchronized:
         adjusting at least one of the first clock and the second clock to synchronize the first clock and the second clock;
         modify at least one of a timestamp within the first alert and a timestamp within the second alert; and
         after having modified at least one of the timestamp within the first alert and the timestamp within the second alert, determine whether the first alert and the second alert satisfy a condition of a rule, wherein the rule determines whether a security incident has occurred.

2. The network security system of claim 1, wherein the manager's processor is further configured to determine whether the first clock and the second clock are synchronized by comparing the time of detection included in the first alert and the time of detection included in the second alert.

3. The network security system of claim 1, wherein adjusting at least one of the first clock and the second clock further comprises:
   selecting one of the first clock and the second clock as a reference clock; and
   adjusting the other clock to the reference clock.

4. The network security system of claim 3, wherein selecting one of the first clock and the second clock comprises determining a relationship of the first clock to a system-wide reference clock and a relationship of the second clock to the system-wide reference clock.

5. The network security system of claim 1, wherein the manager's processor is further configured to:
   store at least one of a first time offset associated with the first clock and a second time offset associated with the second clock; and
   use a stored time offset to modify at least one of the timestamp within the first alert and the timestamp within the second alert.

6. The network security system of claim 1, wherein the manager's processor is further configured to cause the particular event to occur.

7. A method for modifying timestamps in a network security system, the method comprising:
   receiving a first stream of alerts from a first network security device having a first clock, each alert in the first stream representing an event detected by the first network security device and including a time of detection by the first network security device according to the first clock;
   receiving a second stream of alerts from a second network security device having a second clock, each alert in the second stream representing an event detected by the second network security device and including a time of detection by the second network security device according to the second clock;
   identifying a first alert in the first stream and a second alert in the second stream, wherein the first alert represents a particular event, and wherein the second alert represents the same particular event;
   determining, based on the first alert and the second alert, whether the first clock and the second clock are synchronized; and
   when the first clock and the second clock are not synchronized:
      adjusting at least one of the first clock and the second clock to synchronize the first clock and the second clock;
      modifying at least one of a timestamp within the first alert and a timestamp within the second alert; and
      after having modified at least one of the timestamp within the first alert and the timestamp within the second alert, determining whether the first alert and the second alert satisfy a condition of a rule, wherein the rule determines whether a security incident has occurred.

8. The method of claim 7, wherein determining whether the first clock and the second clock are synchronized comprises comparing the time of detection included in the first alert and the time of detection included in the second alert.

9. The method of claim 7, wherein adjusting at least one of the first clock and the second clock further comprises:
   selecting one of the first clock and the second clock as a reference clock; and
   adjusting the other clock to the reference clock.

10. The method of claim 9, wherein selecting one of the first clock and the second clock comprises determining a relationship of the first clock to a system-wide reference clock and a relationship of the second clock to the system-wide reference clock.

11. The method of claim 7, further comprising:
storing at least one of a first time offset associated with the first clock and a second time offset associated with the second clock; and
using a stored time offset to modify at least one of the timestamp within the first alert and the timestamp within the second alert.

12. The method of claim 7, further comprising causing the particular event to occur.

13. A non-transitory machine readable medium storing a set of instructions that, when executed by the machine, cause the machine to:
receive a first stream of alerts from a first network security device having a first clock, each alert in the first stream representing an event detected by the first network security device and including a time of detection by the first network security device according to the first clock;
receive a second stream of alerts from a second network security device having a second clock, each alert in the second stream representing an event detected by the second network security device and including a time of detection by the second network security device according to the second clock;
identify a first alert in the first stream and a second alert in the second stream wherein the first alert represents a particular event, and wherein the second alert represents the same particular event;
determine, based on the first alert and the second alert, whether the first clock and the second clock are synchronized; and
when the first clock and the second clock are not synchronized:
adjust at least one of the first clock and the second clock to synchronize the first clock and the second clock;
modify at least one of a timestamp within the first alert and a timestamp within the second alert; and
after having modified at least one of the timestamp within the first alert and the timestamp within the second alert, determine whether the first alert and the second alert satisfy a condition of a rule, wherein the rule determines whether a security incident has occurred.

14. The non-transitory machine readable medium of claim 13, wherein determining whether the first clock and the second clock are synchronized comprises comparing the time of detection included in the first alert and the time of detection included in the second alert.

15. The non-transitory machine readable medium of claim 13, wherein adjust at least one of the first clock and the second clock further comprises:
select one of the first clock and the second clock as a reference clock; and
adjust the other clock to the reference clock.

16. The non-transitory machine readable medium of claim 15, wherein selecting one of the first clock and the second clock comprises determining a relationship of the first clock to a system-wide reference clock and a relationship of the second clock to the system-wide reference clock.

17. The non-transitory machine readable medium of claim 13, wherein the set of instructions further causes the machine to:
store at least one of a first time offset associated with the first clock and a second time offset associated with the second clock; and
use a stored time offset to modify at least one of the timestamp within the first alert and the timestamp within the second alert.

18. The non-transitory machine readable medium of claim 13, wherein the set of instructions further causes the machine to cause the particular event to occur.

* * * * *